(12) United States Patent
Karch et al.

(10) Patent No.: US 9,809,324 B2
(45) Date of Patent: Nov. 7, 2017

(54) LIGHTNING PROTECTION LAYER FOR FIBER COMPOSITE STRUCTURES

(71) Applicant: Airbus Defence and Space GmbH, Ottobrunn (DE)

(72) Inventors: Christian Karch, Neubiberg (DE); Juergen Steinwandel, Uhldingen-Muehlhofen (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 102 days.

(21) Appl. No.: 14/816,025

(22) Filed: Aug. 2, 2015

(65) Prior Publication Data

US 2016/0031569 A1    Feb. 4, 2016

(30) Foreign Application Priority Data

Aug. 1, 2014    (EP) .................................... 14002686

(51) Int. Cl.
*B64D 45/02*    (2006.01)
*B32B 9/00*    (2006.01)
*B32B 9/04*    (2006.01)

(52) U.S. Cl.
CPC .............. *B64D 45/02* (2013.01); *B32B 9/007* (2013.01); *B32B 9/041* (2013.01); *B32B 2307/202* (2013.01); *B32B 2307/302* (2013.01); *B32B 2571/00* (2013.01)

(58) Field of Classification Search
CPC ....... B64D 45/02; B64C 1/12; B32B 2605/18; B32B 9/007; B32B 9/041; B32B 2307/202; B32B 2307/302; H05K 9/0079; B82Y 30/00; Y10S 977/72; Y10S 977/723; Y10S 977/778; Y10S 977/775
See application file for complete search history.

(56) References Cited

U.S. PATENT DOCUMENTS

| | | | | |
|---|---|---|---|---|
| 8,922,970 B2* | 12/2014 | Hebert | ...................... | B64C 1/12 361/216 |
| 2008/0248275 A1 | 10/2008 | Jang et al. | | |
| 2009/0176112 A1* | 7/2009 | Kruckenberg | ......... | B82Y 30/00 428/457 |
| 2009/0227162 A1* | 9/2009 | Kruckenberg | ......... | B64D 45/02 442/1 |
| 2012/0258323 A1* | 10/2012 | Brown | ................... | B64D 45/02 428/457 |

(Continued)

FOREIGN PATENT DOCUMENTS

| | | | |
|---|---|---|---|
| DE | 10 2006 046 002 A1 | 4/2008 | |
| DE | 102014017198 | * 5/2016 | ............. B64D 45/02 |

(Continued)

OTHER PUBLICATIONS

European Search Report dated Feb. 25, 2015, with Statement of Relevancy (Six (6) pages).

*Primary Examiner* — Benjamin P Lee
(74) *Attorney, Agent, or Firm* — Crowell & Moring LLP

(57) ABSTRACT

Specified is a lightning protection layer for an aircraft. The lightning protection layer has a first stratum and a second stratum. The second stratum is coupled to the first stratum along a connecting surface. The first stratum has a metal foil and the second stratum has carbon allotropes. It is thus made possible that damage to a structure of the aircraft by lightning strike is reduced.

13 Claims, 1 Drawing Sheet

(56) References Cited

U.S. PATENT DOCUMENTS

| | | | | |
|---|---|---|---|---|
| 2013/0048331 A1* | 2/2013 | Fornes | ............... | B64D 45/02 174/2 |
| 2013/0056244 A1* | 3/2013 | Srinivas | ............... | G06F 3/041 174/250 |
| 2014/0011414 A1* | 1/2014 | Kruckenberg | ............ | B32B 5/16 442/181 |
| 2015/0053663 A1* | 2/2015 | Sakota | ............... | B64C 1/12 219/202 |
| 2016/0107739 A1* | 4/2016 | Restuccia | ............ | B29C 70/885 428/114 |
| 2016/0165706 A1* | 6/2016 | Clemen, Jr. | ............... | H05F 7/00 361/218 |

FOREIGN PATENT DOCUMENTS

| | | |
|---|---|---|
| EP | 2 511 174 A2 | 10/2012 |
| EP | 2 682 262 A1 | 1/2014 |

\* cited by examiner

LIGHTNING PROTECTION LAYER FOR FIBER COMPOSITE STRUCTURES

CROSS REFERENCE TO RELATED APPLICATIONS

This application claims priority under 35 U.S.C. §119 to European patent application number 14 002 686.5, filed Aug. 1, 2014, the entire disclosure of which is herein expressly incorporated by reference.

FIELD OF THE INVENTION

The invention relates to the lightning protection of vehicles, in particular the lightning protection of aircraft and spacecraft. The invention relates to a lightning protection layer for an aircraft and spacecraft, and for an aircraft or spacecraft with such a lightning protection layer.

BACKGROUND OF THE INVENTION

The use of larger structures such as parts of a vehicle body or an aircraft fuselage in fiber composite design (e.g. carbon fiber reinforced plastic, CFRP, construction or fiberglass plastic, fiberglass, construction) may require protection of these structures against the effects of a lightning strike. The occurrence of the lightning strike is substantially analogous in the case of fiber composite components to the occurrence in metallic or electrically and thermally conductive structures. This results in the formation of a pre-discharge plasma channel and subsequently thereafter in lightning discharge. Depending on the location of the first point of contact, i.e. the point on the surface of the structure which is first contacted by the lightning, the lightning channel is then drawn across the surface of the structure to a first surge current discharge. With the contact of the lightning channel and the structure surface, a high flow of current and heat transfer is linked to the affected structure. The parameters which characterize the intensity of the lightning discharge do not differ, or do not differ substantially, between fiber composite structures and metal components. Typically, the thermal conductivity and the electric conductivity of fiber composite components are less, or significantly less, than that of metallic structures. A lightning protection can thus be necessary for fiber composite structures.

In the case of coated fiber composite structures, the direct lightning damage is substantially caused by an explosion of the lightning protection caused by the lightning strike. A lightning protection may consist of expanded copper foil which is laminated into an epoxy resin. The explosion of the lightning protection is caused by the direct heat of the plasma channel and by the Joule heat generated by the lightning current in the expanded copper foil.

For the protection of fiber composite structures against damage, in particular thermo-mechanical damage, during lightning strikes, expanded metal foils, in particular copper foils, are usually used. These expanded copper foils are applied as an outer stratum on an outer surface of the fiber composite structure and laminated into the fiber composite component. Expanded metal foils are advantageous due to the formability to a surface shape, for example on double-curved structures. For protection against environmental influences, this fiber composite structure is then protected with an electrically non-conductive dielectric paint. Due to the physical properties of such conventional dielectric coatings, a concentration or a constriction of a plasma channel arising during a lightning strike at the base point or point of impact can occur on the surface of the fiber composite structure during a lightning strike. Furthermore, such a coating can hinder or prevent a uniform spread of the base point of the lightning channel across the surface of the fiber composite structure. The direct heating of the plasma channel and the Joule heating of the lightning current can also lead to an explosion of the lightning protection layer, which is located beneath the coating.

Alternatively to a lightning protection having expanded metal foil, US 2008/0248275 A1 describes a lightning protection which consists of individual, overlapping graphene layers.

SUMMARY OF THE INVENTION

It can be regarded as an object of the invention to improve the lightning protection of fiber composite structures.

This object is achieved by the subject of the independent claims. Further developments of the invention arise from the dependent claims and the following description.

In particular, the subject of the independent claims enables the extent of damage, for example thermo-mechanical damage, to a fiber composite structure by a lightning strike to be reduced or even avoided completely.

According to one aspect of the invention, a lightning protection layer for an aircraft or spacecraft is provided. The lightning protection layer has a first stratum and a second stratum. The second stratum is coupled to the first stratum along a connecting surface. The first stratum comprises a metal foil. The second stratum comprises carbon allotropes.

The second stratum is in particular disposed such that it is closer to a surface of the aircraft than the first stratum. In other words, the second stratum covers the first stratum.

The carbon allotropes of the second stratum can be, for example, graphene layers. The graphene layers reduce the amount of generated Joule heat and, due to their relatively high thermal conductivity, quickly lead the heat away from the point of impact of the lightning. This means that less energy is available for the near-surface explosion of the mixture, which consists, for example, of expanded metal foil and epoxy resin. The thermo-mechanical or mechanical damage to the fiber composite structure, similar to a high-speed impact, is therefore reduced, because the shock wave produced by the explosion has a lower amplitude in the fiber composite structure.

Due to the presence of the carbon allotropes in the second stratum of the metallic coating, the described effects enable the metal foil of the first stratum, which two-dimensionally distributes the current and heat, to be formed more thinly. A part of the weight which is required solely for lightning protection is thus first reduced. The thermal and mechanical damage to a fiber composite structure is reduced and the repair costs for a fiber composite structure following a lightning strike can be significantly reduced.

The connecting surface between the first stratum and the second stratum is a first surface of the first stratum. This means that the second stratum is connected with the first stratum, for example by means of a cohesive connection with or without additional material or by means of an adhesive connection, and that the second stratum lies directly on the first stratum. In one embodiment, the second stratum may be applied by a joining method to the first stratum, so that a permanent connection between the first stratum and the second stratum is formed along the connecting surface.

The first stratum and the second stratum of the lightning protection are disposed parallel to one another and are adjacent to each other. In the depth direction of the lightning protection layer, these two strata are arranged one above the other.

The metal foil is a flat, electrically and thermally conductive element, such as a copper foil. The metal foil may be a metal foil without recesses or may have a plurality of recesses or openings. The second stratum is at least partially constructed of carbon allotropes or has carbon allotropes.

According to one embodiment of the invention, the metal foil is an expanded copper foil.

The expanded copper foil is a single-piece, reticular, flat structure and has a plurality of recesses. Such expanded copper foil has, for example, a thickness of a few tens of μm to a few hundred μm, and typically has a basis weight between 70 and 200 g/m$^2$. By means of this formation, the expanded copper foil is particularly formable to multiply-curved surfaces, for example an outer structure of an aircraft.

According to a further embodiment of the invention, the carbon allotropes of the second stratum are executed as at least one two-dimensional flat graphene layer.

Graphenes are two-dimensional, flat elements consisting of carbon and have a thickness, for example, of ideally an atomic layer or a few nanometers, up to ten nm. Graphene is characterized by a high temperature resistance and good electrical and thermal conductivity, which is generally greater than the electrical and thermal conductivity of metals such as copper.

According to a further embodiment of the invention, the second stratum has more than ten graphene layers.

The graphene layers are disposed above one another or stacked on one another, so that the total thickness of the second stratum, and thus the thermal resistance and the electrical and thermal conductivity, is further increased.

In a line of sight from the aircraft exterior to the aircraft interior, the graphene layers of the second stratum are disposed behind one another and the first stratum is located behind the second stratum.

According to a further embodiment of the invention, the lightning protection layer further comprises a third stratum. The third stratum is disposed so that the first stratum is disposed between the second stratum and the third stratum. The third stratum comprises carbon allotropes.

In other words, the third stratum is located behind the first stratum. In particular, the first stratum is disposed directly between the second stratum and the third stratum, i.e. the first stratum is directly adjacent to the second stratum on one side and the third stratum on the other side. The second stratum is adjacent to a first surface of the first stratum and the third stratum is adjacent to a second surface of the first stratum. The first and second surfaces of the first stratum are arranged opposite to each other.

According to a further embodiment of the invention, the carbon allotropes of the third stratum are executed as at least one two-dimensional flat graphene layer.

According to a further embodiment of the invention, the third stratum has more than ten graphene layers.

The third stratum is thus constructed comparably to the second stratum. In one embodiment, the third stratum and the second stratum are identically constructed. In another embodiment, the third stratum is constructed symmetrically to the second stratum with respect to the first stratum.

According to a further embodiment of the invention, the lightning protection layer comprises a fourth stratum. The fourth stratum is disposed so that the second stratum is disposed between the first stratum and the fourth stratum. The fourth stratum is admixed with electrically conductive elements.

The electrically conductive elements of the fourth stratum reduce the dielectric strength of the surface of the lightning protection layer, i.e. the energy required by the charge carrier to break through these layers or strata is less. The lightning channel can therefore move more easily across the surface of the lightning protection layer as is the case with a dielectric coating layer with high dielectric strength. The length of time during which the lightning channel remains at a fixed point on the surface of the lightning protection layer and the fiber composite structure is reduced in this way. The introduced electrically conductive elements cause a large-scale formation of so-called streamers that can connect to the approaching lightning bolt. The flash channel is thus not constricted in the region of its base point, as is the case in a conventional coating, but rather expanded. This expansion in turn causes a distribution of the current flow and the heat input to a larger area with the result of reduced thermal stress on the fiber composite structure in the region of the base point. In other words, the power introduced by the lightning strike is reduced per unit of area, and thus also thermo-mechanical damage to the fiber composite structure caused by the lightning strike.

According to a further embodiment of the invention, these electrically conductive elements may be, for example, carbon allotropes. In the electrically conductive elements, this may particularly involve carbon nanotubes (CNT).

According to a further embodiment of the invention, the fourth stratum is a coating layer which is admixed with the electrically conductive elements.

The coating layer thus represents a surface protection and surface of the lightning protection layer and of the aircraft and protects both the lightning protection layer as well as the aircraft from environmental influences.

According to a further embodiment of the invention, the fourth stratum is admixed with electrically conductive elements such that the percolation threshold of the fourth stratum is not met or just reached, but is in any case not exceeded.

So few electrically conductive elements, such as carbon allotropes or CNTs, are added to the coating layer and the fourth stratum that the fourth stratum is not electrically conductive in a base state. Thus, the mechanical, electrical and thermal properties of the fourth stratum are not altered, or not substantially altered, so that the basic requirements of a surface layer or coating layer of an aircraft are not influenced, or are hardly influenced, by the addition of electrically conductive elements. During a lightning strike, however, the electrically conductive elements, for example in the form of carbon allotropes, allow that a forming plasma channel can move along the fourth stratum, i.e. across a surface of the aircraft, so that the stresses by the lightning strike are not concentrated in one place, thus reducing the potentially occurring damage.

In other words, the lightning protection layer as described above and below is characterized as follows: described is a hybrid lightning protection layer for fiber composite structures. The lightning protection layer consists of at least two strata. A first stratum has an expanded metal foil, which is electrically and thermally conductive. The expanded metal foil has, for example, a thickness between 10 μm and 250 μm, preferably between 40 μm and 120 μm, and typically has a basis weight of between, for example, 70 g/m$^2$ and 200 g/m$^2$. A second stratum, which extends along the first stratum, has at least one graphene layer, i.e. a two-dimensional flat formation of carbon. A further stratum (fourth stratum) consists of a coating, for example a polyurethane-based coating, which is admixed with electrically conductive elements, for example with CNT, and disposed across the second stratum. Under the first stratum, a further stratum (third stratum) with at least one graphene layer can be disposed such that the first stratum with the expanded metal foil is disposed between the second stratum and the third stratum and is coupled directly therewith. The directional indications above and below with respect to the lightning protection layer should be understood such that "up" is directed toward a vehicle exterior and "down" is directed toward the vehicle interior.

The combination of strata with expanded metal foil and graphene layers at least along one surface of the expanded metal foil can especially help to reduce or avoid thermo-mechanical damage of a fiber composite structure during a lightning strike or through a lightning strike.

An advantage of this hybrid lightning protection layer is that the thickness of the expanded metal foil, and thus the basis weight of the hybrid lightning protection layer, can be reduced. Likewise, thermo-mechanical or mechanical damage to the fiber-composite structure can be reduced because the graphene layers used have greater electrical and thermal conductivity than the fiber composite structure. Likewise, the high temperature resistance of graphene layers, with a melting point of over 4000° C. (compared to about 1100° C. for copper), helps to reduce damage by a lightning strike on the fiber composite structure. The formation of the lightning protection layer helps in that an amplitude of the Joule heat generated by the lightning strike is reduced. Furthermore, due to their higher thermal conductivity, the graphene layers can direct the generated heat away from the point of lightning impact better and more quickly than the fiber composite structure and the metallic foil. These effects can add up to the fact that there is less energy available for the explosion or damage to the lightning protection layer. Furthermore, the shock wave caused by the explosion has less energy, so that mechanical damage to the fiber composite structure that may possibly be caused thereby can be reduced.

According to a further aspect of the invention, an aircraft with a lightning protection layer as described above and below is specified. The lightning protection layer extending along at least a part or a portion of an outer surface of the aircraft.

For example, the lightning protection layer can extend along an airfoil or along a fuselage of the aircraft.

According to one embodiment of the invention, the lightning protection layer is disposed such that the first stratum is disposed between the second stratum and an inner space of the aircraft.

According to a further embodiment of the invention, the lightning protection layer extends along the entire outer surface of the aircraft.

BRIEF DESCRIPTION OF THE DRAWINGS

Hereinafter will be more nearly discussed with reference to the accompanying drawings exemplary embodiments of the invention.

The representations in the figures are schematic and not to scale. Where identical reference characters are used, they refer to similar or identical elements.

DETAILED DESCRIPTION OF THE DRAWINGS

Figure 1:
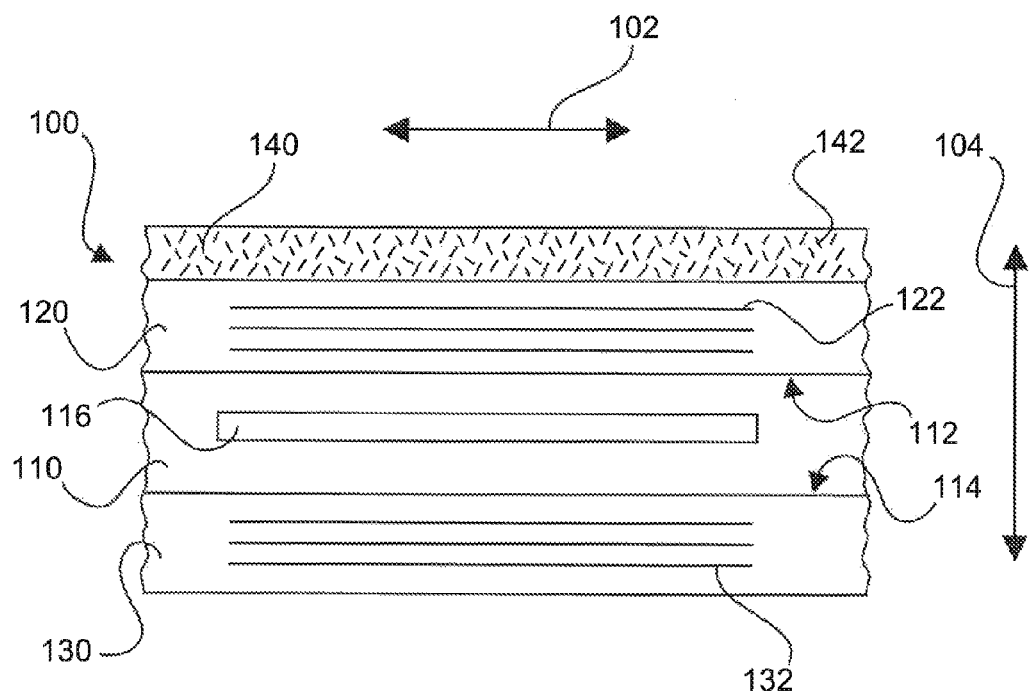
FIG. 1 shows a schematic representation of the formation of a lightning protection layer according to one embodiment of the invention; and, FIG. 2 shows a schematic representation of an aircraft with a lightning protection layer according to another embodiment of the invention.

FIG. 1 shows a cross-sectional representation of a lightning protection layer 100. The lightning protection layer 100 has a first stratum 110, a second stratum 120, a third stratum 130 and a fourth stratum 140.

The lightning protection layer 100 can serve, for example, as an exterior cladding of a vehicle, especially an aircraft. Thereby, the strata 110, 120, 130 and 140 are disposed such that the third stratum 130 is facing an interior space of the vehicle, then follow in the direction of the surroundings of the vehicle the first stratum 110, the second stratum 120 and the fourth stratum 140. This sequence of strata from inside to outside corresponds to a direction from bottom to top in FIG. 1 along the arrow 104.

The first stratum 110 has a metal foil 116, which extends two-dimensionally in a longitudinal direction 102 and in a transverse direction (not shown, inward and outward from the drawing plane of FIG. 1).

The first stratum 110 has a first surface 112 and a second surface 114 which each extend parallel to the metal foil 116. The first surface and the second surface are disposed opposite to one another.

The second stratum 120 is coupled to the first surface 112 of the first stratum 110 and has a plurality of overlapping graphene layers 122. The graphene layers are disposed one above the other and extend respectively along an extension direction of the first stratum 110.

The third stratum 130 has a formation comparable to the second stratum 120. Just as the second stratum 120, the third stratum 130 has a plurality of overlapping graphene layers 132.

The fourth stratum 140 is provided with electrically conductive elements 142. The electrically conductive elements are, for example carbon nanotubes (CNT), which are located in a coating layer or are mixed into a coating of the fourth stratum.

The fourth stratum 140 is in particular a coating layer which protects the lightning protection layer 100 and the aircraft from environmental influences.

Figure 2:
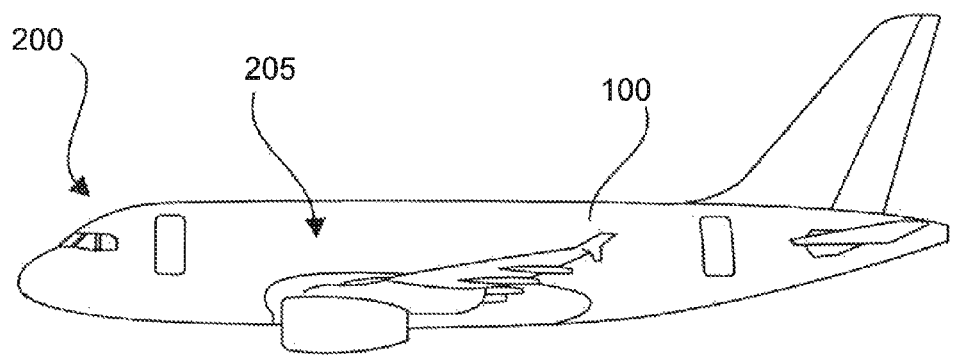

FIG. 2 shows an aircraft 200, on the outer surface 205 of which a lightning protection layer 100 is disposed.

LIST OF REFERENCE CHARACTERS 100 lightning protection layer
102 longitudinal direction
104 depth direction
110 first stratum
112 first surface
114 second surface
116 metal foil
120 second stratum
122 graphene layer
130 third stratum
132 graphene layer
140 fourth stratum
142 carbon nanotubes
200 aircraft
205 outer surface

What is claimed is:
1. A lightning protection layer for an aircraft, comprising:
a first stratum;
a second stratum, which is coupled with the first stratum along a connecting surface; and a third stratum which is arranged such that the first stratum is disposed between the second stratum and the third stratum, wherein the first stratum has a metal foil, wherein the second stratum has at least one two-dimensional flat graphene later, wherein the third stratum has at least one two-dimensional flat graphene layer.

2. The lightning protection layer according to claim 1, wherein the metal foil is an expanded copper foil.

3. The lightning protection layer according to claim 1, wherein the second stratum has more than ten graphene layers.

4. The lightning protection layer according to claim 1, wherein the carbon allotropes of the third stratum are executed as at least one two-dimensional reticular graphene layer.

5. The lightning protection layer according to claim 4, wherein the third stratum has more than ten graphene layers.

6. The lightning protection layer according to claim 1, further having a fourth stratum which is disposed such that the second stratum is disposed between the first stratum and the fourth stratum;

wherein the fourth stratum is provided with conductive elements.

7. The lightning protection layer according to claim 6, wherein the electrically conductive elements are carbon allotropes.

8. The lightning protection layer according to claim 6, wherein the carbon allotropes of the fourth stratum are carbon nanotubes.

9. The lightning protection layer according to claim 6, wherein the fourth stratum is a coating layer, which is admixed with electrically conductive elements.

10. The lightning protection layer according to claim 6, wherein the fourth stratum is admixed with electrically conductive elements such that the percolation threshold is not met.

11. An aircraft with a lightning protection layer, wherein the lightning protection layer comprises:

a first stratum;

a second stratum, which is coupled with the first stratum along a connecting surface;

a third stratum which is arranged such that the first stratum is disposed between the second stratum and the third stratum, wherein the first stratum has a metal foil, wherein the second stratum has at least one two-dimensional flat graphene layer, wherein the third stratum has at least one two-dimensional flat graphene layer, wherein the lightning protection layer extends at least along a part of an outer surface of the aircraft.

12. The aircraft according to claim 11, wherein the lightning protection layer is disposed such that the first stratum is disposed between the second stratum and an inner space of the aircraft.

13. The aircraft according to claim 11, wherein the lightning protection layer extends along the entire outer surface of the aircraft.

\* \* \* \* \*